DAVID ARONSON
INVENTOR.

DAVID ARONSON
INVENTOR.

May 28, 1968 D. ARONSON 3,385,074
FREEZE CRYSTALLIZATION WASHING AND REMELTING
ON A COMMON ROTARY SURFACE
Filed Oct. 4, 1965 5 Sheets-Sheet 3

DAVID ARONSON
INVENTOR.

DAVID ARONSON
INVENTOR.

May 28, 1968

D. ARONSON 3,385,074

FREEZE CRYSTALLIZATION WASHING AND REMELTING
ON A COMMON ROTARY SURFACE

Filed Oct. 4, 1965

DAVID ARONSON
*INVENTOR.*

BY Daniel H. Bobis
*Atty*

United States Patent Office 3,385,074
Patented May 28, 1968

3,385,074
FREEZE CRYSTALLIZATION, WASHING AND REMELTING ON A COMMON ROTARY SURFACE
David Aronson, Upper Montclair, N.J., assignor to Worthington Corporation, Harrison, N.J., a corporation of Delaware
Continuation-in-part of application Ser. No. 425,967, Jan. 15, 1965. This application Oct. 4, 1965, Ser. No. 492,779
10 Claims. (Cl. 62—58)

ABSTRACT OF THE DISCLOSURE

A system for extracting a relatively pure solvent from a solution including flash freezing solvent on crystal forming surfaces and washing and melting the crystals while they remain on the surfaces. The surfaces are rotated within a single chamber to provide uniform crystal growth and to remove adhering solution from the crystals.

---

This application is a continuation-in-part of my United States patent application Ser. No. 425,967 filed Jan. 15, 1965, for "Freeze Purification Method and Apparatus."

*Freeze purification—general*

In general, this invention relates to a new and improved method of an apparatus for the freeze purification of liquid and more particularly to a method of, an apparatus for the continuous freeze purification of saline water or other aqueous liquid system.

The present invention is directed to a novel method of separating an aqueous solution into a more concentrated solution and a less concentrated solution by flash freezing of the deaerated solution to form pure water crystals and then melting the pure water crystals. That portion of the brine feed which is not transformed into crystals is thereby increased in concentration by the removal of a portion of the water solvent, and the other portion which is crystallized is subsequently obtained as a less concentrated solution by means of washing from the crystals the adherent brine liquor and then melting the washed crystals. The flash freezing is accomplished by evaporation of the water at a very high rate in an evacuated chamber. The water vapor released during this freezing is then applied to the melting of ice crystals formed previously in another portion of the system. Since melting must take place at a higher temperature than that at which freezing took place, the water vapor must be compressed from the lower pressure associated with freezing to the higher pressure required to effect melting. Possible means of carrying out the compression process or its equivalent are described subsequently.

*In situ operation in cyclic fashion*

The method of the present invention is intended to be carried out in a cyclic fashion with each cycle consisting of freezing, washing, and melting. The duration of any cycle is very short, in fact, only a few minutes in length. A purification system contains two or more chambers which are identical in construction and mode of operation. During operation, each chamber is at a different phase of the cycle, but in such relationship that while one chamber or set of chambers is undergoing the freezing step the other chamber or set of chambers is undergoing the melting step; then subsequently the relationship is reversed with the chamber which had been going through the freezing step now having melting take place while the chamber previously in the melting phase now having freezing occur. In between the freezing and melting steps a washing operation will have been completed, as will be described later. The novel feature of this invention is that the freezing occurs with formation of crystals on solid surfaces to which the crystals adhere during the subsequent operations of washing and melting. The solid surfaces are rotated during the formation of crystals thereon to assure an even distribution of crystals on the surfaces.

In the past, the separation of the brine liquor from the ice and the subsequent melting of the crystals has called for the transportation of the ice-brine mixture from the point of freezing to the point of washing, and then from the point of washing to the point of melting. This transfer operation is one of several factors that has contributed significantly to the large physical size and the cost of running a freeze purification plant. Reference is made to the description of such a plant using flash freezing by evaporation and compression of water vapor to effect melting, in "Vacuum-Freezing and Vapor Compression for Desalting Seawater," Chemical Engineering, June 22, 1964, pages 114–116. The transportation methods and distribution devices for handling ice and ice slurries are illustrated. The need for such methods and devices is obviated by the in situ mode of operation disclosed herein.

*In situ operation with intermediate refrigerant in direct contact with brine to be purified*

In an attempt to eliminate the need for the transfer operations shown in the reference given above, another method has been proposed in recent years, which called for direct contact of an immiscible refrigerant such as isobutane to obtain freezing and the subsequent melting. This process used direct contact freezing by having low temperature boiling isobutane remove heat from the brine. Since the isobutane had been in contact with the ice crystals and with the concentrated brine, removal operations were required for separating the isobutane from both the concentrated waste and the less concentrated ultimate purified water product. Because isobutane boils at a pressure many times higher than water at the freezing temperature of the ice-brine mixture, the operations of freezing and melting could be made to take place beneath a level of liquid refrigerant or mixture of refrigerant and aqueous brine, and conventional separating and filtering devices such as screens or woven cloths could be employed to restrain the flow of crystals from the system, or such crystals could be held in place by traps relying on the differences in specific gravity between ice crystals and water, or between ice crystals and isobutane.

With flash freezing or water vapor melting, such submerged modes of operation are not feasible because of the extremely low vapor pressure of water vapor at temperatures around 32° F.

*In situ operation using water vapor refrigeration and heating*

The inherent limitations imposed by the extremely low vapor pressure and hence extremely large vapor volume flows associated with water vapor operations for freezing and melting are overcome by the novel method of having the freezing take place by spraying the saline water on screens rotating past the spray nozzles to achieve a uniform distribution of adhering ice crystals over the surface of the screens. The spraying occurs under the low pressure conditions required for flash freezing. By arranging these surfaces in a suitable pattern, adequate flow area can be provided for escape of the water vapor formed by flash freezing, and yet there be ample surface on which the ice crystals can adhere with only a shallow buildup of crystals. This limited buildup of crystals is of extreme importance in avoiding the entrapment of concentrated brine by layers of crystals and in permitting subsequent effective washing off of the adherent brine by a limited quantity of wash water.

Compression of water vapor

As stated previously the water vapor required for the melting of the ice crystals must be at a higher pressure than that at which the water vapor boils off from the brine feed as crystallization takes place initially. The compression of the water vapor from the lower to the higher pressure can be effected directly as is described in the reference given previously, Chemical Engineering, June 22, 1964, pages 114–116, or can be carried out by indirect means so that water vapor is removed by some physical or chemical process at a lower pressure and subsequently released at a higher pressure. Because of the inordinately large volumes to be handled, direct compression is limited to moderate sized plants. The direct compression can be effected by means of well-known centrifugal or axial flow compressors, or rotating or reciprocating positive displacement compressors. Limitations on their use are largely economic in nature. A steam jet compressor can be used, which will be advantageous where low first cost is desirable. A portion of the discharge from this compressor will have to be condensed by means of refrigeration or compressed by means of a second stage of steam jet operation.

Indirect compression processes may take several forms. The water vapor coming off from the freezing mixture can be condensed on a cold heat transfer surface with the condensate simultaneously freezing and forming a film of ice or ice crystals on the heat transfer surface. In the subsequent step of melting the ice crystals which constitute the major portion of product purified water, the heat transfer surface is heated. This heating melts and vaporizes the water previously deposited during the flash freezing step. Such mode of operation with the actual formation of a layer of ice on the heat transfer surface is technically and economically feasible so long as the buildup of ice is limited. That this is in the range of likely operation of the purification system is indicated by the fact that the deposit of ice on the heat transfer surface is in proportion to the crystals formed on the screens, plates, or rods, as one is to eight. Since, as explained heretofore, the buildup of crystal layers must be limited to give efficient operation of the purification and washing steps, this leads to an acceptable limit of buildup of ice on the refrigerated heat transfer surfaces.

Should particular conditions of operation indicate that despite the rather thin layer of ice formed, such an ice layer restricts the rate at which the process can be operated, then an anti-freeze solution can be sprayed over the heat transfer surfaces. Suitable solutions include brines of sodium or calcium chloride, or organic fluids such as aqueous solutions of glycols, amines, or alcohols.

If the concentration of the above mentioned fluids in water can be sufficiently high, as is possible with a solution such as lithium bromide in water, then the water vapor can be converted from the gaseous to the the liquid phase, essentially an absorption process, at a temperature appreciably higher than the freezing point of water. The choice of a particular method of removing the water vapor as a liquid depends on the particular set of conditions of a proposed installation, and includes consideration of the energy sources available, the size of the installation, the purity of the product desired, or concentration of the brine being purified, etc.

Choice of energy sources for operation of purification process

The major energy requirements for the process arise from the need to pump heat from a lower temperature level to a higher temperature level; in a real sense, a refrigeration operation. As with other refrigeration operations, the energy to run the system may be in the form of mechanical energy or thermal energy, or a combination of the two. Suitable mechanical energy sources are electric motor drives, steam turbines or engines, internal combustion engines or turbines, or other types of heat-powered engines. Thermal energy sources include low pressure exhaust steam from steam power electrical generating plants, heated water from solar heated ponds, low grade heat from industrial process plants, jacket water from combustion engines, or the waste heat from gas turbines. For economic justification, the thermal energy must be from a source at a relatively low temperature.

While the freezing, washing and melting chambers remain unchanged in design and arrangement whether mechanical energy or thermal energy is used as power source, the equipment for the condensation and subsequent evolution of water vapor will vary in design and mode of operation with the choice of energy source. With whatever system is employed, there will be a certain amount of work to be done pumping liquids from one vessel or one level to another. This pump work is most conveniently done by means of motor, engine or turbine driven pumps. No further consideration is given in this disclosure to the matter of pumping fluids since it follows well-established pump practice.

The other energy requirements which are the major ones will often be associated with another operation, such as electric power generation, chemical plant operation, etc. In the subsequent section on the economics of the process, there is a discussion of the influence of availability of energy source on the choice of mechanical energy versus thermal energy for running of the water purification plant.

The actual amount of energy required to carry out a practical purification operation depends on the salinity of the feed, the temperature of the feed, and the desired purity of the product. The latter consideration influences the amount of washing required to reduce the residue of adherent brine on the ice crystals, but this consideration has no bearing on the thermodynamic analysis. The two other factors lend themselves to analysis and this has been done by Henry Curran in an article: "Energy Computations for Saline Water Conversion by Idealized Freezing process" in Saline Water Conversion, Advances in Chemistry, Series 27, American Chemical Society (1960), pp. 56–74. He shows the breakdown of the two major energy requirements into:

(1) The refrigeration (or energy transfer) for the actual freezing-melting operation.
(2) The refrigeration for cooling down the feed stream to the freezing temperature from that of the available feed.

The freezing-melting operation energy input is dependent on the concentration to which the feed is carried in the process, and the temperature differences for heat transfer to the freezing mixture and to the melt. The more concentrated the final stream, the lower must be the temperature at which freezing occurs, and hence the greater the temperature difference between freezing and melting. A stage-wise operation can be carried out so that a portion of the freezing is done with a more dilute stream and a second portion is done with the discharge of the first stage.

The refrigeration for cooling down is largely dependent on the effectiveness of the heat exchangers used for transferring heat from effluent to feed, and by the fraction of feed that is converted to desired product potable water. This load is reduced as the yield ratio is increased, but this savings is obtained at the cost of a higher energy for converting the more concentrated final stream to potable water. Henry Curran in his article has calculated where the optimum lies for different sets of conditions of heat exchanger performance, and temperature differences maintained during the freezing-melting operation.

These two phases of the process actually involve distinct operations, with the differences varying with the method of refrigeration. For systems having direct water vapor compression for ice formation, a portion of the compressed vapor can be used for ice melting. However, that portion of vapor corresponding to the cooling down of the feed from the temperature of the feed leaving the precooler to the temperature of freezing, must be condensed by means of an auxiliary refrigeration system. This can be a mechanical refrigeration system absorbing heat at about 35° F. and rejecting it at the temperature of the ambient heat sink. While the water vapor can be compressed directly to the pressure required for condensing at ambient temperature, there are certain practical limitations on the design of a suitable compressor because of high pressure ratio. Steam jet compressors could be used were low pressure steam readily available.

For systems having indirect refrigeration (or heat pumping) for freezing and subsequent melting, a similar arrangement is required. If the indirect refrigeration is carried out without an absorbent solution or an anti-freeze solution, then a portion of the water vapor evolved on heating up the deposited brine must be either condensed against a supplementary cooled heat transfer surface at a temperature corresponding to melting ice, or absorbed in an absorbent solution, such as strong lithium bromide brine, or compressed to a pressure at which it can be condensed by means of heat exchange with available cooling water, which may be sea water or the effluent from the purification process. If mechanical compression or mechanical compression refrigeration is used, then mechanical energy input is required. If absorption refrigeration is used for this supplementary removal of water vapor, then thermal energy is suitable. Generally speaking, this thermal energy must be supplied at a higher temperature level than that used for the basic freezing-melting operation.

Similar removal of this excessive water vapor is associated with the anti-freeze or absorbent solution if one is used for avoiding ice formaton on the heat transfer surfaces. With such solutions being sprayed over the tubes, the reconcentration of the solutions as they become diluted by reason of the excess water vapor absorbed, can be carried out in the same chamber as generating the water vapor for melting the product ice crystals, or can be carried out in supplementary chambers. This excess water vapor is that associated with the water vapor evolved from the feed during the time it flashes down to the pressure and temperature conditions in the freeze chamber, but prior to the actual freezing (crystal forming) operation.

The actual regeneration is carried out in different fashion if lithium bromide is to be concentrated than if a sodium chloride brine is to be concentrated. The lithium bromide absorbs water vapor from the freezing and flash cooling when the lithium bromide solution is at a temperature as high as 80° F. (for 60% concentration-higher temperatures for higher concentrations). The sodium chloride brine, on the other hand, is used solely as an anti-freeze mixture and must be cooled down to about 28° F. in order to condense the water vapor coming off from the freezing mixture of saline water being processed. The difference in boiling point of the anti-freeze brine and pure water is only a matter of a few degrees. The energy required for operating a heating pump to carry out this concentration is quite small. However, the energy requirement for the cooling down of the feed calls for a supplementary refrigeration loop operating between the 25° F. chiller and the ambient heat sink. Alternatively, the supplementary loop can serve as a supplementary condenser for the heat pump operating between freezing and melting chambers, so that this supplementary loop operates between 35° F. and ambient. The choice is largely of mechanical considerations, piping and controls. Thermodynamically there is no distinction.

*Practical design considerations*

The cycle which proceeds in each of the two or more sets of chambers goes through the steps of freezing, washing, and melting. No heat (or energy) is required to be transferred in or out of the chamber during the washing step. During freezing, heat must be removed. This can be done by means of refrigerant boiling inside the tubes, or by means of a low temperature, non-freeze brine being pumped through the tubes. However, if lithium bromide absorption is being employed, then the temperature at which heat is being removed is sufficiently high that ordinary fresh or sea water at ambient temperature can be circulated without concern about freezing. On the other hand, a boiling refrigerant may be used even with the absorption system, because of the desirable feature of only a small amount of liquid being involved since the latent heat effect associated with boiling is much greater than the sensible heat effect of a fluid being pumped through the tubes.

For the melting step, heat can be supplied to the tubes either by a condensing refrigerant or by a heated liquid being pumped through. Whatever the method, the required temperature spread between that at which the freezing step takes place and that at which the melting step takes place is from 15° F. to 30° F.—the choice depending on the salinity of the outgoing waste stream, the amount of heat transfer surface employed, and the heat transfer coefficients attainable in a given system. Temperature spreads outside the range indicated may be used, but would not be generally indicated as optimum. With a thermal energy source as compared with a mechanical energy source, the temperature spread with the former source is likely to be associated with a higher optimum value.

The use of lithium bromide as absorbent introduces a certain complication not present with the use of sodium chloride or sea water brines as anti-freeze and partial absorbent. There is a slight tendency for some of the solution being sprayed over the tubes to splatter over the guard pans and get into the freeze-wash-melt chambers. Should this occur with sodium chloride or sea water, the effect on final product purity would be negligible and the cost of the lost concentrated anti-freeze solution would be trivial. Lithium bromide on the other hand is expensive and its loss might add a noticeable amount to the total cost. Hence care must be attached to the design of the spray system employed. While lithium bromide is essentially non-toxic, there may be objection to the presence of lithium ion even in trace quantities in the product water. This may prove unimportant, but is mentioned as a consideration in deciding on the choice of mode of operation where alternates are indicated.

Aside from all other considerations, the flash freezing system with crystals being formed or deposited on solid surfaces, appears to lead to much more compact purification plants than other comparable plants. The rate of crystallization appears to be extremely rapid, which may be associated with some nucleating effect of the surfaces on crystal formation, or simply with the increased surface available for mass and heat transfer. Further, the disposition of crystals with a large exposed area in a given volume, reduces the size of equipment associated with the washing operation.

It may be found nevertheless that there are advantages to eliminating the washing step. By continuously flash freezing and melting the solution, the solute concentration can be lowered until it reaches the level of potability.

The present invention also contemplates a more efficient method of washing the surfaces on which the ice crystals have been formed by rapidly rotating the surfaces during the washing step so that, by centrifugal force, the brine will be separated from the accumulated ice crystals at a high speed to centrifugally separate the brine from the adhered ice crystals. Still further, by continuously rotating the screens during the rinse and melting steps of the cyclic operation, it is possible to decrease the rinse and melting times because the melted water will be, by centrifugal force, removed from the screen in a far quicker manner than mere reliance upon gravity.

*Comparison with other freeze purification systems*

Perhaps, the advantages of the present invention vis-a-vis the prior art can be summarized by comparing features of the process of the present invention with that of the presently known methods.

WATER DESALINATION

| Invention | Prior Art |
| --- | --- |
| Flash freezing on surfaces with or without recycling. | Flash freezing of recycled brine and crystals. |
| Freezing, washing, and melting on surfaces on which crystals adhere. | Freezing, washing and melting in situ (presumably in baskets, troughs, or similar holding devices) in presence of secondary refrigerant at relatively high vapor pressure. |
| Washing with one or more loops of wash water having a concentration gradient in wash water. | Washing in a tower with movement of ice slurry counter to movement of wash water—concentration gradient of adherent brine and wash water in contact with ice. |
| All compartments undergo same cycle of operations, but are out of phase with one another so that functions at any one instance are different in each compartment. | Compartments have same function at all times, with each compartment having a different function than every other compartment, one for freezing, one for transfer, one for washing and one for melting. |
| Lithium bromide as absorbent:<br>a. With heat source and heat sink.<br>b. With compressor handling secondary refrigerant in indirect heat transfer. | Lithium bromide as absorbent:<br>a. With heat source and heat sink. |
| Sodium chloride or sea water as anti-freeze, secondary action as absorbent unimportant, with a secondary refrigerant in indirect heat transfer. | Secondary refrigerant in direct contact heat transfer, such as propane, butane, isobutane. |
| Mechanical compression (possible but not favored) in switching operation, with supplementary refrigeration. | Mechanical compression with steady state conditions, compressing vapor from freezing conditions to melting, with supplementary refrigeration. |
| Supplementary refrigeration by any established method, vapor compression, absorption, steam jet. | Supplementary refrigeration by any established method, vapor compression, absorption, steam jet. |

From the above, it will be understood that the general objects of the present invention are to achieve a new and improved method of and apparatus for the freeze purification of saline water.

Another object of the present invention is the provision of a new and better freeze purification method for saline water which eliminates the need for a secondary solution to achieve direct contact freezing of the water.

Still another object of the present invention is the provision of a new and less costly (more efficient) method for the freeze purification of saline water which is cyclic in nature and is adaptable to economically utilize the energy sources available.

A further object of this invention is the provision of a new and better method of providing potable water from a saline solution which is capable of forming part of an automatic cyclic system needing only steam at close to normal turbine exhaust pressure as a major energy source for operation of the apparatus.

A still further object of this invention is the provision of a new and better system for obtaining from a solution a liquid depleted of the major portion of the solute initially present by the steps of freezing a portion of the solvent to form a layer of crystals and melting the crystals in place with recycling of the collected melted crystals until a desired low concentration of the solution is achieved.

Another object of this invention is the provision of a new and better system for obtaining from a solution a liquid depleted of the major portion of the solute initially present by the steps of freezing a portion of the solvent to form a layer of crystals on the surface, and melting the crystals in place with recycling of the collected melted crystals until a desired low concentration of the solution is achieved wherein the freezing is achieved uniformly over the surface and, additionally, the time necessary to achieve melting is considerably reduced.

Other objects will appear hereinafter.

For the purpose of illustrating the invention, there are shown in the drawings forms which are presently preferred; it being understood however, that this invention is not limited to the precise arrangements and instrumentalities shown.

Figure 1:
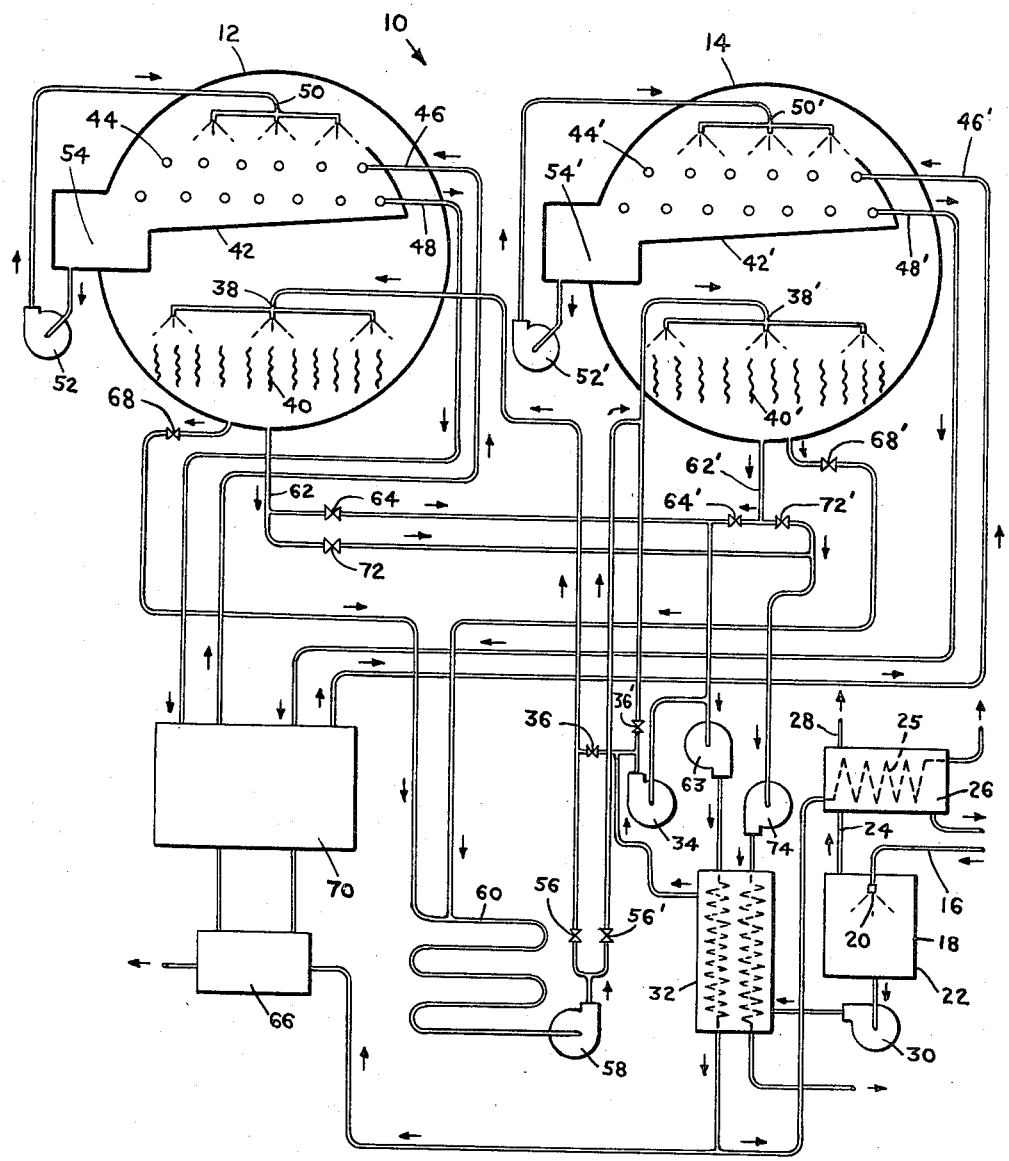
FIGURE 1 is a schematic showing of the apparatus utilized in the present invention.

In FIGURE 1, there is shown in schematic form, the system of the present invention generally designated by the numeral 10. The system 10 includes two chambers 12 and 14 which, during their operation are intended to be operated with the same cyclic steps of freezing, washing, and melting, but out of phase with respect to each other. Thus, for purposes of the description herein, the chamber 12 will be considered as initially undergoing the freezing step while the chamber 14 is undergoing the melting step.

In the operation of system 10, saline water to be purified is fed through a conduit 16 into a deaerator 18. The deaerator 18 includes a nozzle 20 located within a chamber 22, which nozzle 20 is connected to the conduit 16. Vapor is removed through a vacuum conduit 24. Thus, the saline water is sprayed by nozzle 20 so that any air or water vapor is released to be removed through vacuum conduit 24. Vacuum conduit 24 is connected to a condenser 26 and thence through a conduit 28 to a vacuum pump (not shown). The water vapor is condensed in the condenser 26 on the condenser coil 25. This condensed water is collected and added to the fresh water purified by the system.

The saline water which has been deaerated in the deaerator 22 is then passed through a charge pump 30 to a heat exchanger 32.

The system 10, in one specific embodiment of the present invention, was intended to produce 250,000 gallons per day of potable water. In this regard, 100,000 pounds per hour of ice had to be formed to meet the output requirements. Accordingly, 292,000 pounds per hour of saline water with a brine concentration of 3.5% at 75° F. was supplied to the inlet conduit 16. The charge pump 30 pumped the saline water at approximately 75° F. The saline water which entered the heat exchanger 32 at 75° F. gave up heat in a manner which will be discussed below so that the saline water fed from the heat exchanger 32 to a circulating pump 34 was at a temperature of 37° F. The saline water as it left the circulating pump 34 had a large head and a relatively low temperature.

The circulating pump 34 is connected through a valve 36 to a group of spray nozzles 38 within the chamber 12. The valve 36 is opened during the initial freezing step for chamber 12. Chamber 12 is evacuated in the specific embodiment discussed above to a pressure of .138 inch of mercury absolute.

The spray nozzles 38 direct the saline water over parallel freeze plates or screens 40 for a period of 15 to 30 seconds. Because of the low pressure maintained within the chamber 12, the vapor pressure of the saline water being sprayed will cause a certain amount of evaporation, which evaporation will lower the temperature of the saline water to cause freezing. This freezing results in ice crystals, being formed on the screens with the concurrent separation of the brine liquor about the crystals. The freezing operation is continued for such period of time—averaging about 30 seconds—as will build up a layer of crystals thin enough to permit effective washing subsequently and to provide space between adjacent ice-covered screens as to allow ready passage of steam vapor in the reverse direction during the melting cycle. A further limitation on the thickness of the ice buildup is the tendency to entrap an increasingly greater proportion of saline liquid.

It will thus be seen that the flash freezing step of the present invention consists of separating a portion of the solvent (water) present in the solution (saline water) by freezing a portion of the solvent to form a layer of ice crystals whose temperature is the same as the temperature of the remaining more concentrated solution.

Within the chamber 12, there is provided a wall 42 which directs the water vapor which evolves during the flash freezing step into a second section of the chamber 12 within which is positioned an evaporating or condensing tube bank 44. The tube bank 44 is supplied with a refrigerant such as R-12 or its equivalent at approximately 24° F. through an inlet conduit 46, which refrigerant is removed through an outlet conduit 48. The tube bank 44 is at the very low temperature of 24° F. which would normally be expected to cause freezing of the water vapor condensing thereon. However, a group of spray nozzles 50 are provided, which nozzles 50 spray an antifreeze solution such as a 15% sodium chloride solution over the tube bank 44 to lower the freezing point of the water vapor condensing on the tube bank 44 to a point lower than 24° F. The sodium chloride solution is, in the specific embodiments discussed above, at approximately 28° F. when it is sprayed from the nozzles 50. The nozzles 50 are supplied with the sodium chloride solution from a circulating pump 52. The pump 52 receives the supply of sodium chloride solution from a reservoir 54 at the base of the chamber 12. The reservoir 54 collects the sodium chloride solution, as it is sprayed and returns it to the nozzles 50.

After the 15 to 30 second interval during which the saline water is sprayed from nozzles 38, valve 36 is closed and a wash valve 56 is opened. Wash valve 56 connects spray nozzles 38 with a wash pump 58. The wash pump 58 receives a supply of wash fluid from a wash water holding loop 60. The wash water holding loop 60 feeds was water which varies in concentration from 3% to ¼% saline solution. The wash water from the nozzles 38 washes the brine liquor from the ice crystals formed on the screens or plates 40. The initial washing of the brine liquor from the ice crystals forms a higher concentration (i.e. 6% to 3%) saline solution which is drained through a withdrawal conduit 62 and open valve 64 to a brine waste pump 63 whose output connects to the heat exchanger 32 to aid in the cooling of the saline water fed from the charge pump 30.

After the initial washing, valve 64 is closed and a wash water valve 68 is opened which will divert a lower percentage mixture of wash liquid and brine liquor into the wash water holding loop 60 so that a new supply of wash water is available at the same concentrations as in the previous cycle.

It should be noted that the higher concentration saline solution enters the heat exchanger 32 at 25° F. and leaves the heat exchanger at 65° F. In the specific embodiment, the higher concentration saline solution leaves the heat exchanger at the rate of 205,000 pounds per hour. This solution at 65° F. is utilized to act as the coolant fluid for the condenser coil 25 in the deaerator condenser 26, and as the coolant for the hot side of a refrigeration unit in a supplementary condenser 66 whose purpose will be discussed below. After passing through the condensers 26 and 66, the higher concentration saline solution is returned to the sea.

After completion of the wash cycle (about 60 seconds in the preferred embodiment), melting is started and carried out for about 30 seconds. Melting is achieved by reversing the refrigerant in the condensing and evaporating tube bank 44. The refrigerant which has passed out of the outlet conduit 48 to tube bank 44 enters a heat pump system 70 which is operative to raise the pressure to a condensing temperature of the refrigerant at approximately 39° F. The operation of the heat pump system 70 will be described more fully below.

Since the condenser 39 is now at a high temperature, the water vapor absorbed in the sodium chloride solution in the reservoir 54 will evaporate to form steam. This steam will melt the ice on freeze plates 40 to form fresh water. Further, the steam will condense and add more fresh water to the extent that the fresh water produced will comprise 88% from the melted ice and about 12% from the condensed steam. Thus, most of the water vapor lost during the flash freezing step has been returned to the fresh water product during the melting step. This fresh water is removed through conduit 62 and the now opened fresh water valve 72. The fresh water is pumped by a fresh water pump 74 having an output of 400 gallons per minute at 32° F. to feed a second coil of the heat exchanger 32. The fresh water is removed from the heat exchanger 32 at 65° F. The fresh water leaves the heat exchanger 32 at approximately 87,000 pounds per hour. This completes the cycle of operation for the chamber 12.

It will be understood that some ice may be allowed to remain on the screens 40 at the completion of the cycle without interfering with subsequent cyclic operations.

The second chamber 14 is utilized so that while the chamber 12 is undergoing the freezing step of the cycle, the chamber 14 can be undergoing the melting step of the cycle. In chamber 14, there are provided a plurality of freezer plates 40' which are sprayed from nozzles 38'. The chamber 14 is substantially similar to the chamber 12 and all similar parts thereof are indicated with prime numerals. Thus, the chamber 14 has a separator wall 42' which separates the freeze plates and screen section thereof from condenser and evaporator tube bank 44' which bank is connected to inlet and outlet conduits 46' and 48'. The condenser and evaporator tube bank 44' is sprayed from a set of nozzles 50' with the sodium chloride solution from the pump 52'. The pump 52' also is supplied from a reservoir 54' at the base of the tube bank section. The circulating pump 34 feeds the saline solution through a valve 36' to the nozzles 38' during the flash freezing step, which step occurs while the chamber 12 is undergoing its melting step. Thus, during the flash freezing step the tube bank 44' has a refrigerant fed therethrough at 24° F. whereas during the same time the melting step is being undertaken in the chamber 12 so that the refrigerant entering the conduits 46 is at approximately 39° F. Accordingly, the heat pump system 70 which controls the temperature differential between the tube banks 44 and 44' must increase the pressure of refrigerant the equivalent of 15° F. saturation temperature, from the time it leaves outlet conduit 48′ until it reaches inlet conduit 46. The heat pump system uses 380 horsepower and is further aided by the supplementary refrigeration loop 66 which will operate at approximately 29° F. evaporating. The heat pump system is further operative to compress the refrigerant during the heating step so that the refrigerant is condensed when it enters the inlet conduit 46. The supplementary refrigeration loop 66 further collects additional water vapor from the sprayed brine solution from heat exchanger 32. Accordingly, the supplementary refrigeration loop is additionally effective to add to the total product achieved by the system. Complete condensation of the refrigerant within the tube bank 44 is assured by reason of the transfer of heat from the refrigerant to the antifreeze solution from spray 50 to cause vaporization of the water which has been absorbed by the antifreeze solution during the freezing step. The operation of supplementary refrigeration loop 66 is more fully described in connection with FIGURE 4.

The wash operation in the chamber 14 utilizes the same wash pump 58 with a connection through valve 56′ to the nozzles 38′ during the wash steps. The initial waste material is removed through a valve 64′ connected to a conduit 62′ with the final wash solution being returned to the wash hold loop 60 through a final wash valve 68′ similar to valve 58 discussed previously.

During the melting step, the fresh water is removed through fresh water valve 72′. It will be noted that the fresh water melted from chamber 14 is utilized in the heat exchanger 32 to cool the brine being fed during the freezing operation for chamber 12.

While the system has just been explained based on the use of an antifreeze solution to avoid the formation of an ice deposit on the cooling coils, it is possible to operate the system without employing such an antifreeze solution. If the time of operation of the freezing portion of the cycle of FIG. 1 is kept short enough, then the ice formed as a result of condensation of water vapor on coils 44 or 44′ will not build up to such a thickness as to interfere disadvantageously with the necessary heat transfer from condensing vapor to refrigerant in the said coils. Accordingly the system shown in FIG. 1 may be operated without circulation of the antifreeze solution and without the spraying of antifreeze solution from nozzles 50 and 50′ over coils 44 and 44′ respectively. It is necessary to remove that portion of the water vapor to be driven off from the coils which is in excess of that required for melting of the ice formed on the crystallizing surfaces by condensing on chilled coils provided by supplementary refrigeration system 66 which chilled coils are maintained at a temperature close to the melting point of ice.

Figure 2:
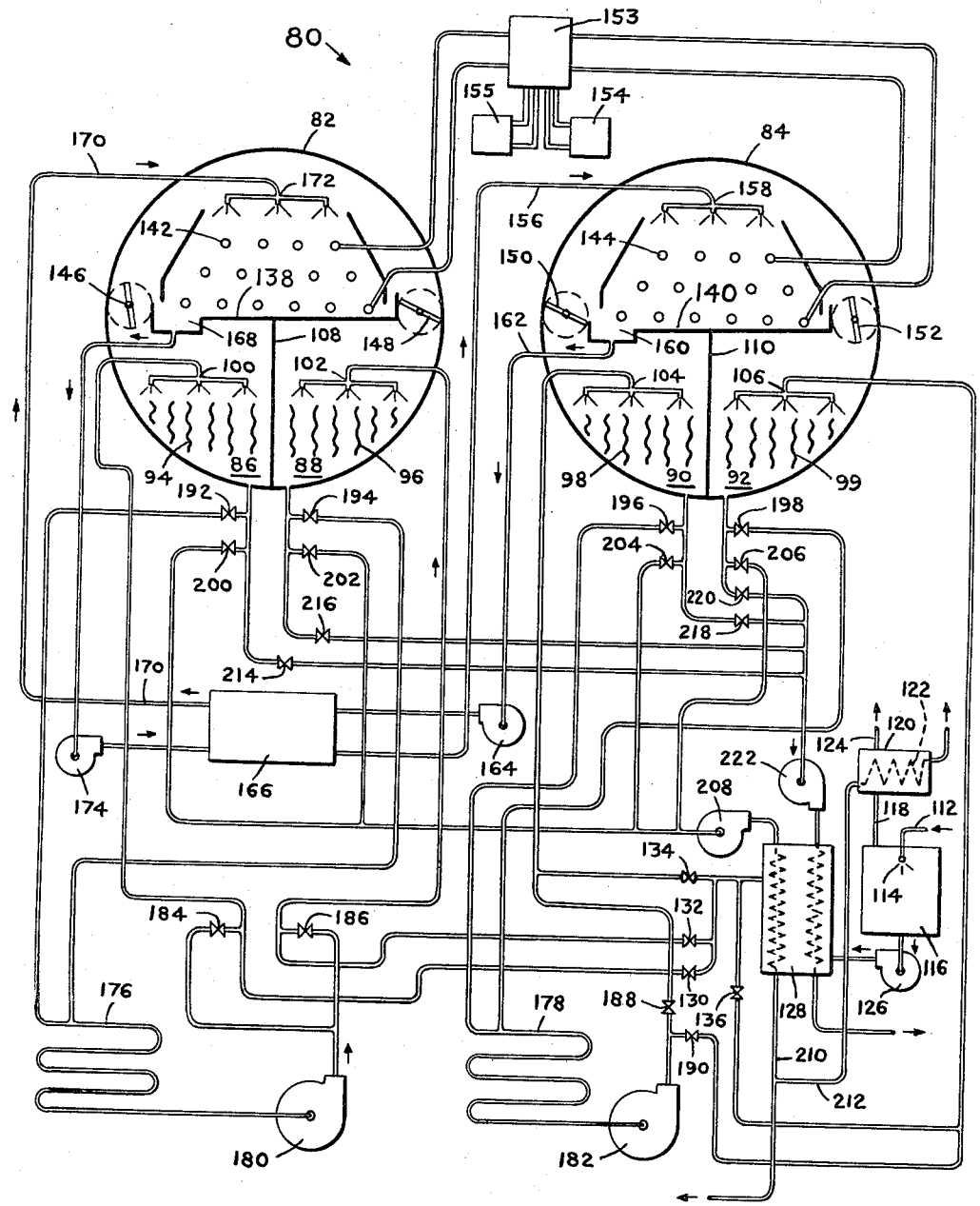
FIGURE 2 is a schematic showing of a second embodiment of the present invention utilizing split process chambers.

In FIGURE 2, which is based on lithium bromide as an absorbent there is shown a dual compartment two chamber system generally designated by the numeral 80. The dual compartment system comprises two chambers 82 and 84 each having two compartments 86, 88 and 90, 92 respectively. The compartments 86–92 each have a respective set of parallel screens or plates 94, 96, 98 and 99 adapted to be sprayed by their respective spray nozzles 100, 102, 104 and 106. Compartments 86 and 88 are divided by a separator wall 108 and compartments 90 and 92 are divided by a separator wall 110.

Saline water is supplied to the system 80 through an inlet conduit 112 which feeds the nozzle 114 of a deaerator 116. The deaerator 116 has its air and water vapor removed through a vacuum conduit 118 into a deaerator condenser 120. The deaerator condenser 120 includes a condenser coil 122 through which brine waste from the system 80 passes at a temperature approximately ten degrees lower than the temperature of the saline water input. The deaerator condenser 120 collects fresh water to be combined with the fresh water from the system 80. Further, the deaerator condenser 120 is connected to a vacuum pump (not shown) through a conduit 124 for removing the air from the system.

After the deaeration of the saline water, it is pumped through a charge pump 126 to a heat exchanger 128 wherein it is cooled by the fresh water and brine waste from compartments 86, 88, 90 and 92.

The cooled saline water, after passing through heat exchanger 128, is fed continuously to one of the four compartments 86, 88, 90 or 92 by energization of one of four saline water inlet valves 130, 132, 134 or 136. In FIGURE 2, the saline water is shown entering valve 136 to the exclusion of the other valves 130, 132, 134. This is accomplished during the freezing step in compartment 92. It should be noted that while the freezing step is being accomplished in compartment 92, compartment 86 is undergoing the melting step, compartment 88 is undergoing the initial washing step, and compartment 90 is undergoing the final washing step. In the next step of the purification cycle, valve 130 will open and valve 136 will close so that compartment 86 can start its freezing step. After that, valve 134 will open and valve 130 will close so that compartment 90 can start its freezing step. Finally, valve 132 will open and valve 134 will close so that compartment 88 can start its freezing step. After this, the valve 136 is reopened and valve 132 closed to return to the position shown in FIGURE 2.

Chambers 82 and 84 each has a partial dividing wall 138 and 140 respectively which divide the compartments 86, 88 and 90, 92 from the tube banks 142 and 144 respectively of chambers 82 and 84. The partial divider wall 138 has a rotatable long butterfly type valve or damper 146 at the free end thereof for closing and opening compartment 86 and thus controlling the vapors in compartment 86. In FIGURE 2, the damper 146 is shown in the open position. The compartment 88 also has a rotatable damper 148 associated therewith which, when in the closed position as shown in FIGURE 2, prevents vapors from entering or leaving compartment 88 and to connect the same to the tube bank 142. Similarly, compartment 90 has a rotatable damper 150 associated therewith which is shown in the closed position in FIGURE 2, and compartment 92 has a rotatable damper 152 associated therewith which is shown in the opened position in FIGURE 2. It will be noted that the rotatable dampers 146, 148, 150 and 152 are in the closed position when their respective compartments are undergoing the washing steps. Conversely, the rotatable dampers 146, 148, 150 and 152 are in their open position when their respective compartments are undergoing the freezing or melting steps.

During the freezing step, the saline water is fed through the nozzles 106 to cause flash freezing thereof and formation of ice crystals with a brine liquor thereabout on the screens 99. The water vapor during the flash freezing is condensed on the tube bank 144. The tube bank 144 is supplied with cool water at approximately 80° F. from a source 154 through a valve 153, which source and valve will be discussed below. In order to condense the water vapor on the tube bank 144 which is approximately 50 degrees hotter than the water vapor, a 60% lithium bromide solution is fed through a conduit 156 at approximately 85° F. to spray nozzles 158. The lithium bromide solution absorbs the water vapors because of its extremely high concentration and is collected in a reservoir 160 at the base of the chamber 84. The lithium bromide solution absorbs the water vapor and is cooled by coils 142 to remove the heat of absorption and its temperature is lowered to 82° F. and the concentration of the lithium bromide is lowered to 59%. The collected lithium bromide solution in the reservoir 160 is then continuously passed through a conduit 162 to a first lithium bromide circulating pump 164 and thence to a heat exchanger 166 wherein it is heated by intimate contact with lithium bromide coming from the higher temperature reservoir 168. That is, the lithium bromide enters the heat exchanger 166 at 82°

F. and leaves it at approximately 90° F. The heat exchanger 166 feeds the 90° F. 59% solution of lithium bromide through a conduit 170 to spray nozzles 172 which spray the lithium bromide over the tube bank 142. At this time, the compartment 86 is undergoing the melting process and thus the accumulated water in the lithium bromide solution will be evaporated by the high temperature (95° F.) of the tube bank 142 to achieve melting in the compartment 88. The lithium bromide solution, being heated by the tube bank 142 will reach a temperature of 93° F. and a concentration of 60% when it reaches the reservoir 168. The 60%-93° F. lithium bromide solution is pumped by a second lithium bromide circulating pump 174 back to the heat exchanger 166 wherein its temperature is lowered to 85° F. for recirculation through the spray nozzles 158.

The washing operation is achieved through the use of two wash water holding loops 176 and 178 each having a respective wash pump 180 and 182. Wash pump 180 is connected to valves 184 and 186 in line with spray nozzles 100 and 102 respectively. Wash pump 182 is connected to valves 188 and 190 associated with spray nozzles 104 and 106 respectively. The wash loop 176 receives a low percentage saline solution of wash water and brine liquor from compartments 86 and 88 through valves 192 and 194 respectively. Wash loop 178 receives a low percentage saline solution of wash water and brine liquor from compartments 90 and 92 through valves 196 and 198 respectively. During the initial wash period of a compartment, the high percentage saline solution of initial wash water and brine liquor hereinafter called waste, is drained through one of the respective valves 200, 202, 204, or 206 to a waste pump 208 which pumps the high percentage saline solution through the heat exchanger 128. There the waste absorbs the heat from the input saline water and thence is fed through one conduit 210 back to the sea and, through a second conduit 212, to the condenser coil 122 in deaerator condenser 120. After passing through condenser coil 122, the higher concentration saline solution passes back to the sea. It should be noted that one of the washing steps occurs in only one of the compartments 86 or 88, 90 or 92 associated with the wash water holding loops 176, 178 so that while one compartment of a chamber is undergoing a wash step, the other compartment is not involved in washing. Further it will be noted that, as in the embodiment of FIGURE 1, the wash water holding loop always maintains its percent age gradation from approximately 3% to ¼% as the waste is removed during the washing step, so that valves 200, 202, 204 and 206 are closed and valves 192, 194, 196 and 198 are open to drain the low concentration saline solution back into the wash water holding loops 176 and 178.

The melting step in each compartment is accomplished in substantially the same manner as in the system of FIGURE 1. Fresh water which accumulates in the bottom of the compartments 86-92 as a result of the melting of the ice on the respective screens 94-99 and the condensing of water vapor from the lithium bromide solution is drained from the compartment through the respective valves 214, 216, 218, 220 by a fresh water pump 222 which feeds the cold fresh water through heat exchanger 128 to aid in cooling the input saline water.

Tube banks 142 and 144 are supplied with cooled water at 80° F. from source 155 and with steam at 95° F. from a source 154 which may be the turbine exhaust of a steam power plant. The valve 153 alternately feeds the output sources 154 and 155 to tube banks 142 and 144. It will be understood that when the lithium bromide solution from nozzles 158 and 172 contacts the tube banks 144 and 142 respectively, that the solution will tend to approach the temperature of the tube bank in a very short period of time.

Figure 3:
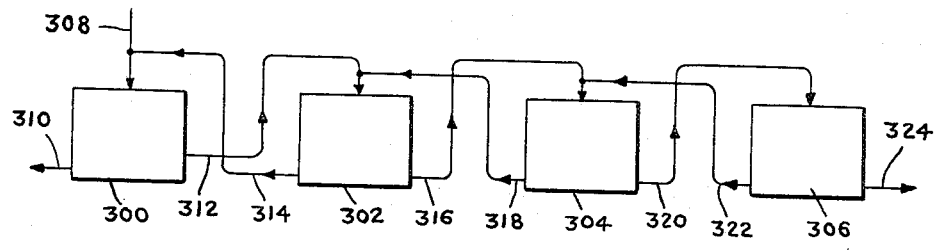
FIGURE 3 is a schematic showing of a third embodiment of the present invention in which the washing step has been eliminated from the process.

In FIGURE 3, there is shown a third embodiment of the present invention which eliminates the washing step. That is, in FIGURE 3, there are shown four separate tanks 300, 302, 304, and 306. The tanks 300, 302, 304 and 306 are substantially similar to the tanks 12, 14. Sea water is introduced into the system of FIGURE 3 by an inlet 308 to tank 300. For example, if the solution in inlet 308 is at 4%, by flash freezing the sea water a brine liquid of approximately 8% concentration will initially be removed through an outlet conduit 310. After this concentrated brine solution is removed, the ice crystals formed in a tank 300 on the screens therein will be melted in the manner shown in FIGURE 1 to produce an outlet solution at conduit 312 which is a 2% solution. This 2% solution is fed to the next tank 302 which operates in substantially the same manner as the tank 300. Thus, tank 302 has a brine outlet conduit 314 which feeds back a 4% solution to the inlet conduit 308 of tank 300. Since the solution fed to tank 302 was a 2% concentration, the melted ice output of tank 302 which is removed through conduit 316 would be approximately a 1% solution. The 1% solution is then fed to a third tank 304. Tank 304 again flash freezes the solution. Its brine output conduit 318 will return a 2% solution to the conduit 312 to be fed to tank 302.

Tank 304 has an output conduit 320 through which will flow a melted ice solution of approximately ½% concentration, which ½% concentration solution will be fed to a fourth tank 306. In tank 306, the input ½% solution will go through a flash freezing step so as to produce a 1% solution in the brine outlet conduit 322, which 1% solution will be added to the conduit 316 to be fed to tank 304. The output conduit 324 of tank 306 will contain a ¼% solution which, for present purposes will be considered potable water.

It will be understood that the percentages utilized in the FIGURE 3 discussion above are merely indicative of values which may be obtained, but, in given instances, it may be desirable to add more tanks or use fewer tanks in accordance with the desired output concentration, the concentration of the sea water being purified, and the change of concentration actually affected in each chamber.

*Recycling of stream leaving freezing chamber*

In connection with arriving at an optimum as between increased concentration of the effluent and therefore a higher pressure ratio in the freezing-melting operation, and a lower concentration of effluent and therefore a higher refrigeration load associated with the end temperature loss for cooling down the feed, some mechanism was implied for controlling the concentration of effluent. One such mechanism is the recycling of the stream draining off the screen, plates, or bank of rods, and returning this to mix in with the feed or to be recycled without additional feed. However, by making the depth of the screens sufficiently great with reference to the displacement of one screen from the next adjacent screen it is possible to attain the desired concentration in a single pass through this bank and thus avoid the requirement of recycling. Accordingly, at the time of initial design it becomes important to establish the ratio of screen depth to spacing that will provide the desired concentration at the rates of crystallizing determined by the available heat transfer surface in condenser or absorber, and the desired temperature difference between crystallizing conditions and condensing or absorbing conditions.

In designing the flash freezing nozzles with respect to the screens and absorption conditions, it was found that when the screens were placed about an inch apart, in parallel planes, the proportion of spray which reached the bottom of the cylinder without contacting a screen was quite small. Initially, some doubts had been raised as to whether it would be more desirable to place the screens at a slight angle to the vertical so that no free falling droplet would bypass the screens. This consideration was found to be of little practical importance, because, on the basis of probability, there would be very few particles which would have just that component of velocity which would send it straight through a narrow passage without hitting the sides of such passages formed by the parallel array of vertical screens.

*Representative set of conditions*

The described FIGURE 1 embodiment of the system of the present invention had a 100,000 pound per hour ice making capacity and was approximately 32 feet long with vacuum cylinders 9 to 10 feet in diameter. The freeze chamber screens had a 30 foot useful length with the screens 20 inches in height spaced one half inch apart so that 120 screens could fit into a 16 inch width. This gave a total surface taken as a plane of 12,000 square feet. The heat transfer coefficient of 1000 B.t.u./hr.-ft.$^2$-F. thus gave a temperature difference between the boiling-freezing layer and the vapor of 1.25° F. Much higher coefficients are anticipated, nevertheless there is ample surface on the screens to provide a close temperature approach.

As ice built up to leave only 25% of the area open, the steam velocity between screens at the inlet periphery was about 150 feet per second which for one velocity head pressure loss corresponded to .06° F.

In the system of FIGURE 2, the rotating dampers 146–152 do not require a tight fit. Since leakage represents only an earlier initiation of melting when the upper section is generating or a prolonged freezing during absorption in the upper section, no adverse effects are had.

In the system of FIGURE 1, a sodium chloride solution or a brine of concentrated sea water can be used as an anti-freeze solution to avoid frost formation on the chilled coils. Some reduction of vapor pressure occurs due to the salt dissolved in the brine, but the magnitude of this reduction is small in comparison with the reduction associated with a lithium bromide solution. The advantage of using sodium chloride or sea water brine is that no special care must be taken to avoid contamination of the saline solution being processed by the absorbent solution or vice versa. The two streams can have the same dissolved salts so that transfer by carryover represents only a minor process loss and not serious contamination.

A further advantage to the use of sodium chloride or sea water brine is the saving in the cost of the lithium bromide solution. However, other factors must be considered such as the advantage in being able to operate at ambient temperatures utilizing the absorption-regeneration sections possible with the lithium bromide solution. Spray carryover of lithium bromide must, however, be carefully guarded against. The use of low impact spray nozzles is helpful in this regard.

*Factors involved in effective washing*

The success of the whole process hinges more on effective washing of the ice crystals than on any other single factor. Careful design and careful manufacture are prerequisites of a satisfactory purification process unit.

Successful washing requires that the water used for washing displace the higher concentration brine and leave a liquid of lower concentration. There are many considerations involved with obtaining good washing efficiency and these are that:

(a) The wash water should be spread to that degree of uniformity which causes wash water to contact the adherent brine liquor with essentially a constant ratio of wash water to each portion of adherent brine;

(b) The degree of contamination (or salinity) of the wash water should be graduated so that during the initial wash step relatively high salinity wash water is used and during the final wash step, fairly pure wash water is used;

(c) Temperature changes in the chamber during washing should be such that undue melting of ice crystals does not occur;

(d) Wash water discharged to waste should be at a higher salt concentration than the feed salt water; and (e) Circuitry should be such that there is no possibility of high salt concentration wash water coming into contact with relatively high purity wash water so as to contaminate the latter.

In view of the relatively short time available for washing in each cycle, there is little opportunity for using a large number of aliquot portions of wash water, each of slightly lower content than the previous one, with the most concentrated portion being discharged to waste each cycle. Instead, the present invention utilizes the wash water holding loop or loops having saline percentage concentration gradients so that the effect is to wash with a stream of increasing purity as the wash steps progress. Further, during the very first portion of the washing cycle the high percentage saline solution is removed. Once the stream coming off the screens drops in concentration to that of the feed this lower concentration of saline solution is returned to the wash water holding loop. Thus the wash water holding loop maintains its concentration gradient constant.

Thus it can be seen that the objects of the present invention have been achieved by the provision of apparatus which will separate a less concentrated solution (potable water) from a relatively more concentrated solution (saline water or sea water) by adiabatic flash cooling of the relatively more concentrated solution to form an ice film on an ice forming surface, washing the brine liquor from the ice while in place on the ice forming surface, and melting the ice to form the less concentrated solution. This cyclic arrangement is especially adaptable to automatic control systems. Because of the in place operation, a substantial saving is achieved and further gains accrue by elimination of the need for secondary refrigerants in direct contact with the process water being purified. Further, the present invention is especially adaptable to wide ranges of temperature and load conditions. Because of the cyclic nature of the process, it tends to stabilize itself, and has the advantage that it can be operated on a continuous or interruptible basis.

Figure 4:
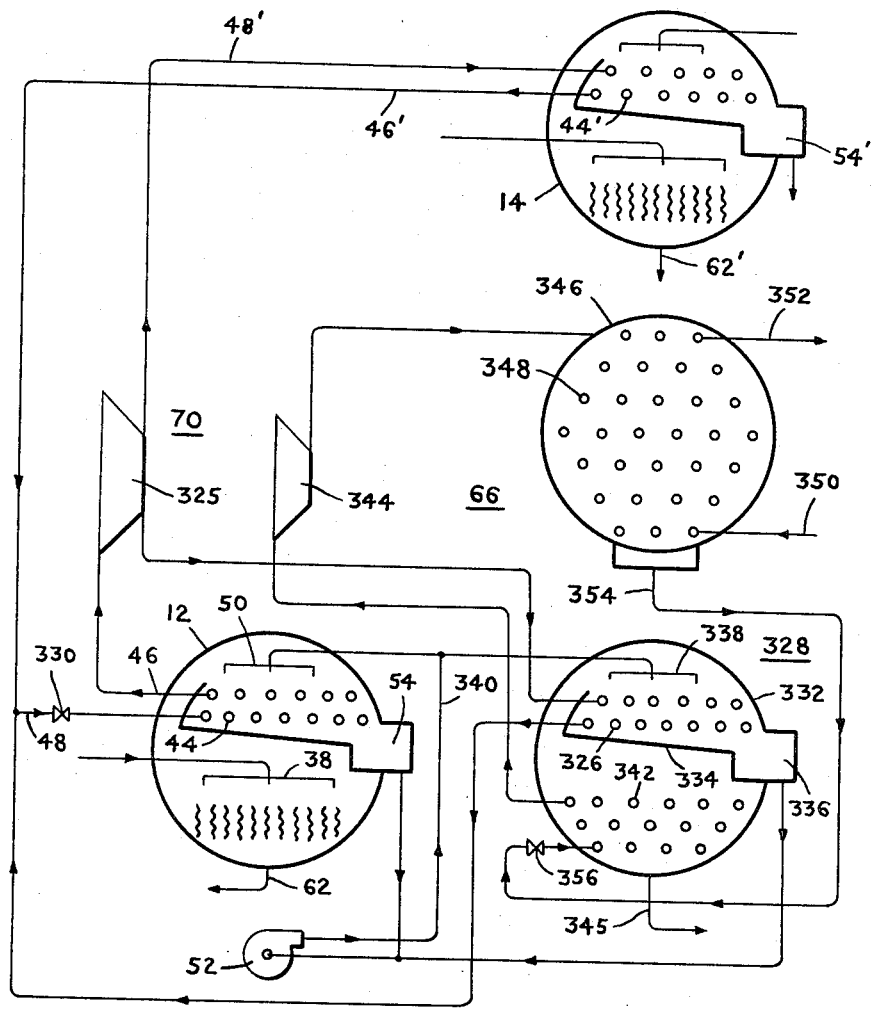
FIGURE 4 is a schematic showing of the supplementary condenser utilized with the apparatus of FIGURE 1.

In FIGURE 4, there is shown the supplementary condenser system 66 as well as the condenser 70 and the chambers 12 and 14 of FIGURE 1. The condenser 70 includes a low pressure ratio compressor 325 which is operative to compress the refrigerant from outlet conduit 46 prior to feeding the heated and compressed refrigerant into the tube 44' of chamber 14 through inlet conduit 48'. Further, the low pressure ratio compressor 325 supplied a portion of the compressed and heated refrigerant to the tubes 326 of a sodium chloride concentrator 328 forming a portion of the supplementary condenser 66. The purpose of the condenser tubes 326 is to remove economically the excess heat which has been delivered to the system during the freeze operation as, it is known, that more heat is needed for freezing purposes than is required for the melting operation and thus, during each cycle, an excess of heat is supplied which must be removed before feeding the refrigerant to the chamber (in this case chamber 14) which is undergoing the melt cycle. The refrigerant which passes through condenser tubes 326 is returned to inlet line 48 for condenser tubes 44 through an expansion valve 330 which forms a portion of the condenser system 70. The sodium chloride concentrator 328 is a tank 332 having a divider wall 334 therein for collecting in a suitable well 336 the sprayed sodium chloride solution from spray nozzles 338. Spray nozzles 338 receive a spray solution from the inlet line 340 for the spray nozzles 50 of the chamber 12. Accordingly, the sodium chloride solution from spray nozzles 338 is heated to give off water vapor and, thus the sodium chloride solution collected in the well 336 is substantially more concentrated than that supplied by the nozzles 338. The concentrated sodium chloride solution from the well 336 is mixed with the concentrated solution from the well 54 of chamber 12 and supplied to the pump 52.

The water vapor which results from the spraying of the sodium chloride solution from the spray nozzles 338 on the tubes 326 is condensed on tubes 342 in the lower half of the chamber 328. Thus this condensed water vapor can then be drained off as a supplementary supply of fresh water through a suitable outlet conduit 345 positioned at the bottom of the tank 332. The tubes 342 are part of a refrigerant loop which includes a high pressure ratio compressor 344 and a condenser 346 all of which are included in the overall supplementary condenser 66. Thus, refrigerant is heated and compressed in the compressor 344 and supplied as a vapor at a high temperature to the refrigerant condenser 346. The refrigerant condenser 346 has a tube bank 348 therein which is supplied with cooling water through an inlet conduit 350, which cooling water will absorb heat from the refrigerant and will thus leave the tube bank 348 at a higher temperature through outlet conduit 352. The refrigerant will condense on the tube bank 348 and will be removed through a drain off conduit 354 at the bottom of the condenser 346. After this partial cooling, the refrigerant is passed through an expansion valve 356 before it enters the tube bank 342. It will be noticed that a large portion of the cooling is achieved through the use of cooling water at ambient temperature supplied through inlet conduit 350 and this will require little or no power consumption for the unit. Accordingly, it will be understood that the supplementary condenser 66 utilizes only the power requirement for the high pressure ratio compressor 344 and further is operative to produce a secondary source of fresh water while maintaining the energy balance in the system. Thus it can be seen that the removal of heat at the low temperature has required the use of a non-freezing brine solution fed to the spray nozzles 50 for absorbing the heat and water vapor coming off from the freezing of the ice crystals and the cooling down of the feed stream. The water vapor absorbed in the brine can be partially driven off by the evaporation of water from the brine when the latter is heated to provide the vapor for meltering of the ice. However, the water vapor absorbed as a result of the flash cooling of the feed cannot be driven off in this manner. For this reason, the supplementary condenser 66 includes the concentrator chamber 328 to effect this concentration of the brine which has absorbed the water vapor during the flash cooling and freezing operation in the chamber.

Thus, the tubes 326 of the concentrator 328 always receive high temperature refrigerant so as to continuously concentrate the sodium chloride solution being supplied thereto. This is true even when the tubes 44 in chamber 12 are operating a melting cycle wherein the tubes 44 also receive high temperature refrigerant.

Figure 5:
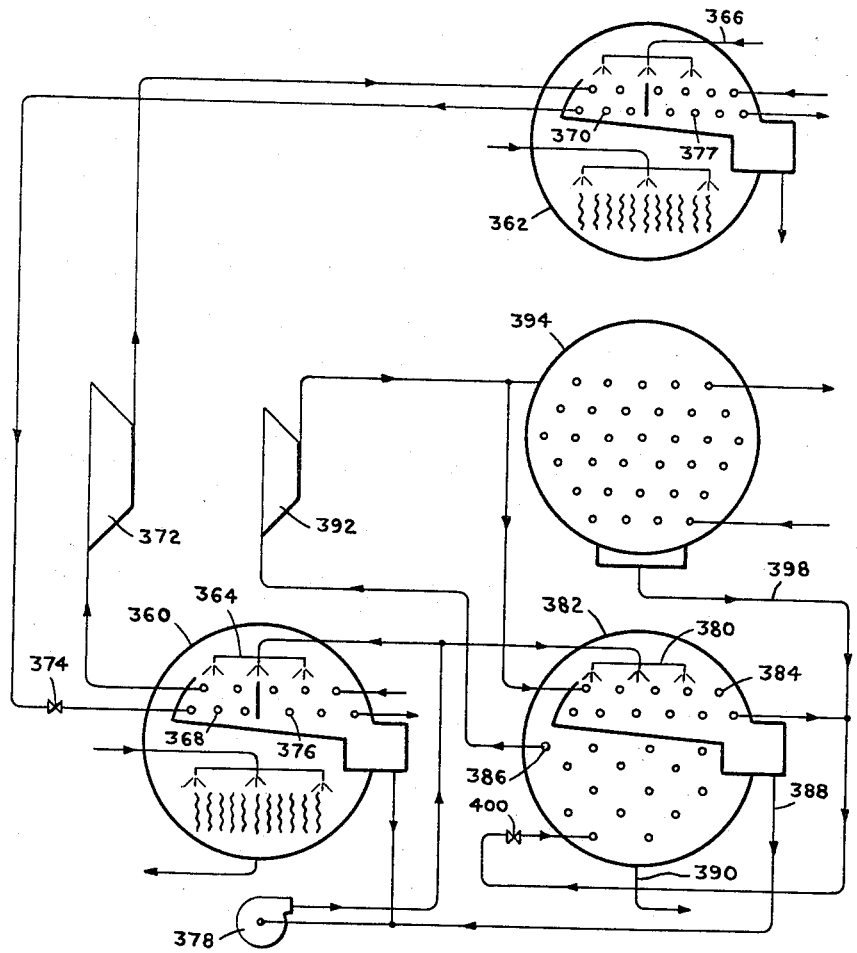
FIGURE 5 is a schematic showing of a supplementary condenser for a lithium bromide system similar to the apparatus of FIGURE 4.

In FIGURE 5, there is shown apparatus for a portion of a saline water conversion system illustrating the supplementary heat pump utilized for reconcentrating lithium bromide where lithium bromide is utilized as the absorption solution. The apparatus of FIGURE 5 is similar to the apparatus of FIGURE 4 in that it includes a first chamber 360 and a second chamber 362 similar to the chambers 12 and 14 except that the spray nozzles 364 and 366 respectively are supplied with a lithium bromide solution. The refrigerant in the cooling tubes 368 and 370 of the chambers 360 and 362 respectively is at a higher temperature than was required in the sodium chloride system of FIGURE 4. That is, the refrigerant will vary in temperature between 80° F. and 95° F. A low pressure ratio compressor 372 is used to raised the pressure and temperature of the refrigerant and an expansion valve 374 is utilized to regulate admission of liquid refrigerant into evaporator 368 where refrigerant boils at the lower pressure. To aid in the cooling operation it is possible to supply sea water through tubes 376 and 377 spaced adjacent to tubes 368 and 370 respectively, which tubes will receive sea water at approximately ambient temperature and will absorb heat from the lithium bromide solution sprayed thereon from the nozzles 364. A pump 378 circulates the lithium bromide and feeds it to the spray nozzles 364 and additionally to spray nozzles 380 in a lithium bromide concentrator chamber 382. The lithium bromide from the spray nozzles 380 is directed at heating tubes 384 within the concentrator chamber 382 to cause vaporization of water, which water will be condensed on tubes 386 in the lower portion of the chamber 382. The concentrated lithium bromide is withdrawn from the chamber 382 from a well 388 and condensed water is removed through a suitable drain 390 at the bottom of the chamber. Refrigerant is supplied to both the heating tubes 384 and the condensing tubes 386. That is, cooled refrigerant at approximately 35° F. is supplied to a high pressure ratio compressor 392 which increases the temperature and pressure of the refrigerant before supplying it to the heating tubes 384. Further, since some of the heat must be removed from the system, the high pressure ratio compressor 392 also feeds a portion of this output to a refrigerant condenser 394. Here the vaporized refrigerant gives up some of its heat to a tube bank 396 which is supplied with sea water at ambient temperature. The now liquid refrigerant is removed through a drain 398 and combined with the refrigerant passing from the heating tubes 384 and fed to an expansion valve 400 which also cools the refrigerant for use in the condensing tubes 386. It will be understood that the regeneration utilizing lithium bromide has been carried out in a different fashion than was utilized with the sodium chloride brine solution. The lithium bromide absorbs water vapor from the freezing and flash cooling when the lithium bromide solution is at a temperature as high as 80° F. The sodium chloride brine solution on the other hand, is used solely as an antifreeze mixture and must be cooled down to about 28° F. to condense the water vapor coming off from the freezing mixture of saline water being processed.

Figure 6:
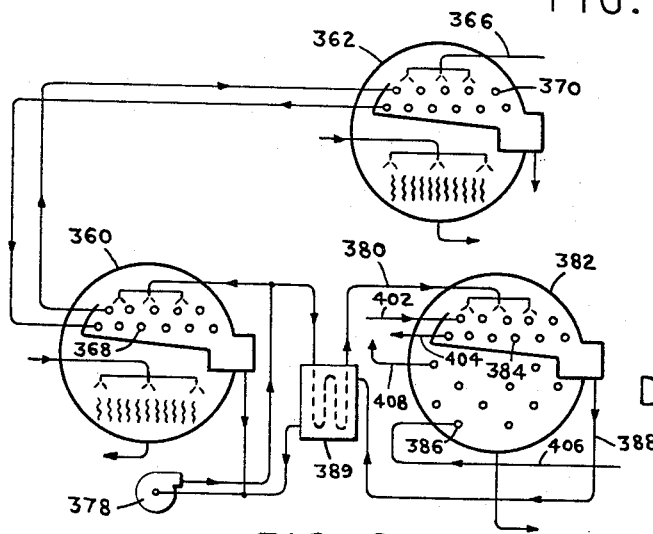
FIGURE 6 is a schematic showing of a supplementary condenser system similar to FIGURE 5 which does not operate as a heat pump, but which has a cyclic variation in the concentration of the lithium bromide absorbent as the operating phase is changed from freezing to melting and vice versa.

An alternative to the heat pump systems of FIGURES 1 and 5 for the basic heat pump operation as well as the reconcentration of lithium bromide is shown in FIGURE 6. A heat source at a sufficiently elevated temperature is used to boil off water vapor from a portion of the lithium bromide and in so doing, raise the concentration of the lithium bromide solution to a sufficiently high level that on return of this lithium bromide solution to the main stream it can produce a mixture of sufficient concentration to continue the freezing and cooling down operation by which the ice crystals are formed. Expressed in another way, the water vapor so driven off is about equal in quantity to that flashed off from the feed mixture as it is admitted to the freezing compartment plus part of that formed by the evaporation associated with the basic freezing process. The thermodynamic process employed for handling the refrigeration load is the basic absorption refrigeration process which calls for the supplying of heat at a sufficiently elevated temperature and the rejection of heat to the ambient at a temperature slightly above ambient. This heat can, in this instance, be rejected only in part to the ice crystals to be melted since more heat is rejected than is absorbed during freezing.

In FIGURE 6, the chambers 360 and 362 are the same except that a thermal loop receives heat from lithium bromide being sprayed over tubes 368 and rejects heat to lithium bromide sprayed over tubes 370. The thermal loop can be a volatile liquid in closed circuit, boiling in tubes 368 and condensing in tubes 370, or can be a liquid pumped around in closed circuit without phase change but with limited temperature rise in tubes 368 and a corresponding drop in tubes 370. Chamber 360 is undergoing freezing of crystals on the screens and chamber 362 is undergoing melting of crystals on the screens. Lithium bromide sprayed over tubes 368 is at higher concentration than the lithium bromide sprayed over tubes 370 by reason of the concentration effected by boiling off of water vapor from the lithium bromide in chamber 382. A portion of the lithium bromide discharged by circulating pump 378 is sent through heat exchanger 389 and fluid conducting means 380 to concentrator 382, where the lithium bromide is further heated by means of steam, hot water or other heat source, supplied by line 402 and removed as liquid by line 404. Water vapor is driven off from the lithium bromide and is condensed on heat exchange surfaces 386, by means of cooling effected by sea water supplied at approximately 80° F. through inlet conduit 406 and removed therefrom by outlet conduit 408. The drain 388 which collects the now concentrated lithium bromide solution is placed in heat exchange relation with the cooling solution being fed to the nozzles 380. In addition to cooling the concentrated lithium bromide prior to feeding this to the pump 378, the lithium bromide solution to be concentrated had been heated partially by passage through this heat exchanger 389.

The system of FIG. 6 differs from those shown in FIGS. 1, 2, 4 and 5, in that the switching operation which changes the temperature-pressure conditions from those leading to freezing of the brine feed to those leading to melting of the deposited ice crystals, and vice versa, is accomplished by switching of the lithium bromide absorption solution, from a relatively concentrated solution to a relatively less concentrated solution, and then back again. The production of the desired concentrations is achieved by any of the several methods of heat addition and heat removal already described and by the driving off or the absorption of water vapor from the solution to be concentrated to the solution to be diluted, respectively.

Thus we have described this system of changing the concentration of aqueous solutions using either thermal or mechanical energy as the source for operation of the process. In practical operation of such systems, there are economic advantages and disadvantages associated with the alternate methods as the system is associated with energy sources as may be available, as for example, a thermal power electrical generating plant. Energy may be taken as a portion of the heat normally to be rejected from such a plant or as the portion of electric power available as surplus when the generating system is operating at less than peak capacity.

If rejected heat is to be used, it is required at a temperature about 30° F. above that of the available cooling water. This imposes a slight reduction in the efficiency of a thermal power electrical generating plant, but the overall energy cost for saline water conversion is still extremely low.

Other forms of low grade heat energy may be a hot well, a shallow lagoon, or solar heated panels. However, these situations are not normal, and thus for most installations, the steam discharged from the final stages of power generating turbines is the more likely situation.

Size also enters into the picture of most suitable process to employ. For small and moderate sized plants the freeze purification system of the present invention appears to be more useful utilizing engine or electric motor drives. On very large size plants, extremely low costs are desirable, i.e. comparable to that of water from nature, so that the desired goal of lowest price is dependent upon "byproduct" setup, and this is most likely to be in conjunction with electric power generation. The two principal methods of such combined operations are:

(a) Saline water conversion using the steam discharged from the final stages of power generating turbines; and (b) Saline water conversion operated on an interruptible basis such that electric power is used as an energy source and the freeze purification plant is run to the extent that excess electric generating capacity is available a part of the day.

For the method (a), some steam would also have to be withdrawn as bleed steam at about 12 p.s.i.g. for the supplementary refrigeration required, but this would only be about 15% of the steam required for the reversible absorption-regeneration operation. The heat rate of the power plant would be increased by about 3% if the final condensing pressure is raised about 30° F. to provide the heat required for the absorption freezing, and if the 15% bleed flow is taken. This means that the boiler, superheater, furnace, fuel handling, and fuel handling equipment would have to be increased 3% for a given net generating capacity. The low pressure turbine would be reduced in physical size because of the exhaust volume flow being cut in half. The saving in the size of the low pressure turbine would more than offset the increase in size of the high pressure turbines which comes to about 3% on an accounting basis.

A plant of 300,000 kilowatts would be able to produce about 25,000,000 gallons per day of potable water when power is being generated at full capacity. The power cost may be represented as shaft power to the generator at 3% of the 300,000 kilowatts or 9,000 kilowatts to give a total of 216,000 kilowatt hours for the 25,000,000 gallons. Since this is equivalent to mechanical power and not electrical power, a rate of 6 mils may be taken to give a cost of $1,296 for energy input. This comes to 5.2 cents per thousand gallons.

In the freeze purification system of FIGURE 1, using electric power for driving the heat pump and supplementary refrigeration unit, 30,000 kilowatts are required for an output of 25,000,000 gallons per day or total of 720,000 kilowatt hours. At the rate of 7 mils per kilowatt hour this comes to 20.2 cents per thousand gallons.

The fuel cost for the system of FIGURE 1 is thus almost four times as high as the system for FIGURE 2, if market prices are taken for the cost of the electric power or the equivalent shaft power. However, if it is assumed that the system of FIGURE 1 would only be run when power is available as surplus, then only the fuel cost of the electric power generation would be attributable to the saline water conversion operation. If this is taken as 50% of the cost of the delivered electric power on such an interruptible basis, then the system of FIGURE 1 can be said to have an energy cost of 10 cents per thousand gallons. Accordingly a comparison can be made of the potable water capacity and the cost for different power loads conditions utilizing the system of FIGURE 1 as outlined above and the system of FIGURE 2 as outlined above.

| Generating Capacity, Percent: | Figure 1 System, Million g.p.d. | Figure 2 System, Million g.p.d. |
| --- | --- | --- |
| 100 | 0 | 25 |
| 90 | 25 | 22.5 |
| 80 | 50 | 20 |
| 60 | 100 | 15 |
| 40 | 150 | 10 |
| 10 | 225 | 2.5 |

From the above table, it can be seen that the absorption system of FIGURE 2 would fit in best with base load plants, whereas the heat pump system of FIGURE 1 would work well with plants having varying loads. While FIGURE 2 system shows a low energy cost, there must be added to this energy cost the increased capital cost of the power plant because of the higher condensing temperatures. Where low temperature cooling water is available, there may not be a significant increased capital cost.

Both systems will have increased amortization charges because of the inability to run at full capacity at all times. With the heat pump system of FIGURE 1, this may put the plant size somewhere in the range of 100,000,000 gallons a day. This would be four times that possible with the absorption system of FIGURE 2.

While this process has been described in terms of the desired objective to produce fresh water from saline water it is equally suited to the concentration of noxious wastes so that the disposal of such waste can be effected with the transportation of a smaller bulk of such waste from the point of its formation to the point of its disposal, assuming that at such point of disposal the increased concentration is not particularly undesirable.

Figure 7:
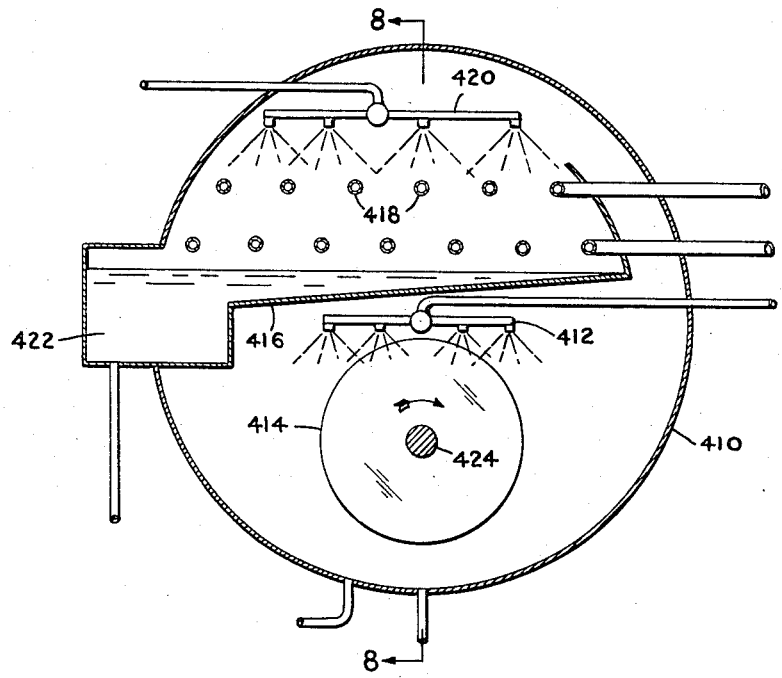
FIGURE 7 is a schematic showing of a chamber comprising another embodiment of the present invention, which chamber could be substituted for the chambers shown in FIGURES 1–6.
Figure 8:
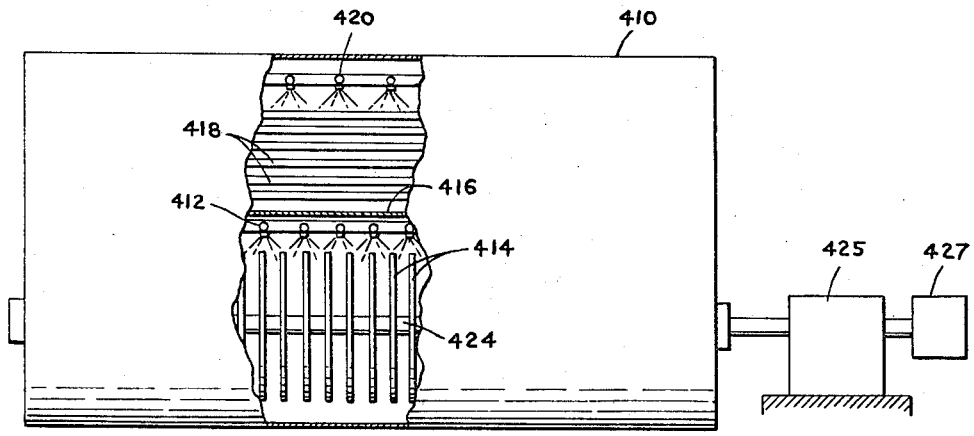
FIGURE 8 is a cross-sectional view of the chamber of FIGURE 7 taken along lines 8—8.

In FIGURES 7 and 8, there is shown another embodiment of the chamber of the present invention generally designated by the numeral 410. The chamber 410 is utilized in the systems shown in FIGURES 1–6 and is substantially similar thereto, the chamber including spray nozzles 412 which direct the saline water over parallel screens 414 located immediately below the spray nozzles 412. Within the chamber 410 there is provided a wall 416 which directs water vapor evolved during the flash freezing step into a second section of the chamber 410 within which is positioned an evaporating and condensing tube bank 418. The evaporating condensing tube bank 418 is sprayed with antifreeze from suitable spray nozzles 420 in the manner discussed previously. A reservoir 422 collects the antifreeze solution for return to the spray nozzles 420 all in a manner previously discussed.

The improvement in the chamber 410 is the use of parallel screens 414 mounted on a drive shaft 424, which drive shaft is connected to a suitable source of rotary power or motor 425. The motor 425 drives shaft 424 causing the screens 414 to rotate. During the initial flash freezing step, the parallel screens 414 are rotated slowly, for example, two to ten revolutions per minute, to insure an even formation of crystal growth across the surfaces of the screens 414. Then, during the steps of washing and rinsing, the motor 425 is accelerated by controller 427 until the screens 414 reach a high speed so as to increase the drainage of the brine and rinse solutions from the screens 414. The stationary screens discussed in the prior embodiments utilized gravity to separate the liquid brine or rinse solution from the crystals. By utilizing centrifugal force, the separation can be achieved more quickly and, accordingly, the period of the cyclic operation can be substantially reduced.

Further, the centrifugal separation will be more efficient in removing brine in the interstices of the crystals built up on the screens. Thus, a pure final product will be achieved utilizing the rotating screens.

The controller 427 decelerates motor 425 during the melting step so that the screens 414 will reach the slow speeds required at the time the melting step ends and the flash freezing step starts for again starting the cyclic operation. Of course, the rotation of the screens 414 during the melting step will not hinder the operation and, in fact, will aid in removing the final product from the screens in a more efficient manner than the prior reliance on gravity.

The screens 414 can be, as shown flat spaced parallel circular discs manufactured of a screen material although, it will be understood that any rough surface capable of achieving nucleating of ice crystals thereon will achieve the same results as that of the present invention. Further, it will be understood that screens 414 need not be flat, but may be, for certain application, conical or saucer shaped.

The present invention may be embodied in other specific forms without departing from the spirit or essential attributes thereof and, accordingly, reference should be made to the appended claims rather than to the foregoing specification as indicating the scope of the invention.

I claim as my invention:

1. A method of separating a less concentrated solution from a relatively more concentrated solution comprising the steps of flash cooling the relatively more concentrated solution in an air evacuated low pressure chamber to form a film of solvent crystals on a crystal forming surface in the chamber with a liquid solute about the crystals, washing the liquid solute from the crystals while in place on the surface, rotating the surface within the chamber to remove the liquid solute from about the crystals, and melting the crystals while on the crystal forming surface within the chamber to form a less concentrated solution.

2. In the method of separating a less concentrated solution from a relatively more concentrated solution of claim 1 wherein the step of flash cooling includes spraying the crystal forming surface with the relatively more concentrated solution from nozzles fixedly positioned with respect to the crystal forming surface, and rotating the crystal forming surface during the step of flash cooling to uniformly build up crystals on the crystal forming surface.

3. The method of separating a less concentrated solution from a relatively more concentrated solution of claim 2 wherein the step of rotating the crystal forming surface during the washing step is accomplished at a higher speed than the rotation of the crystal forming surface during the flash cooling step.

4. The method of separating a less concentrated solution from a relatively more concentrated solution of claim 3 wherein the step of flash cooling is accomplished by spraying the relatively more concentrated solution over the crystal forming surface to form solvent crystals at the same temperature as the adhering liquid solute, the step of washing including spraying the crystal forming surface with a wash liquid, the step of washing further including providing a wash liquid holding loop containing a wash liquid whose concentration is varied from a less concentrated solution to a relatively more concentrated solution, the step of washing including first spraying with the relatively more concentrated solution from the wash liquid holding loop, removing the mixture from relatively more concentrated liquid water and liquid solute, and completing the wash step by spraying the remaining less concentrated solution from the wash liquid holding loop, said step of rotating the crystal forming surface being continued during the entire washing step.

5. The method of claim 3 including the step of rotating the crystal forming surface during the step of melting the crystals, said last mentioned rotating step including decelerating the crystal forming surface to slow down the speed of rotation of the crystal forming surface during the washing step to the speed of rotation of the crystal forming surface during the flash cooling step.

6. Apparatus for obtaining from a solution, a liquid depleted of the major portion of the solute initially present comprising an air evacuated low pressure chamber, solvent crystal forming surfaces within said chamber, flash freezing means operative to form a layer of solvent crystals on said surfaces within said chamber, wash means for washing the liquid solute from said solvent crystals on said crystal forming surfaces within said chamber, a melting means for melting the solvent crystals accumulated on said crystal forming surfaces, and means for rotating said crystal forming surfaces.

7. The apparatus for obtaining from a solution, a liquid depleted of the major portion of the solute initially present of claim 6 wherein said solvent crystal forming surfaces are mounted on a common shaft, said crystal forming surfaces being spaced parallel to one another.

8. The apparatus for obtaining from a solution, a liquid depleted of the major portion of the solute initially present of claim 7 including control means, said control means being operative to control said motive power means to rotate said crystal forming surfaces at a higher speed during operation of said wash means than during the operation of said flash freezing means.

9. The apparatus for obtaining from a solution, a liquid depleted of the major portion of the solute initially present of claim 8 wherein said control means is operative to decelerate said crystal forming surfaces during operation of said melting means to reduce the speed of said crystal forming surfaces from the speed during operation of said washing means to the speed during operation of said flash freezing means.

10. A method of obtaining a less concentrated solution from a relatively more concentrated solution comprising the steps of flash cooling the relatively more concentrated solution to form a layer of solvent crystals on crystal forming surfaces within an air evacuated low pressure chamber, rotating the surfaces within the chamber to centrifuge liquid from about the crystals, washing the crystals while in place on the crystal forming surfaces, and melting the crystals while on the crystal forming surfaces within the chamber to form a less concentrated solution.

References Cited

UNITED STATES PATENTS

| | | | |
|---|---|---|---|
| 3,093,975 | 6/1963 | Zarchin | 62—58 |
| 3,170,779 | 2/1965 | Karnofsky | 62—58 |
| 3,204,419 | 9/1965 | Rose | 62—58 |
| 3,232,218 | 2/1966 | Soussloff | 62—58 |

NORMAN YUDKOFF, *Primary Examiner.*

G. HINES, *Assistant Examiner.*